July 1, 1952     A. B. SEPPMANN     2,601,909
EMERGENCY BRAKE LOCK
Filed Dec. 15, 1947     2 SHEETS—SHEET 2
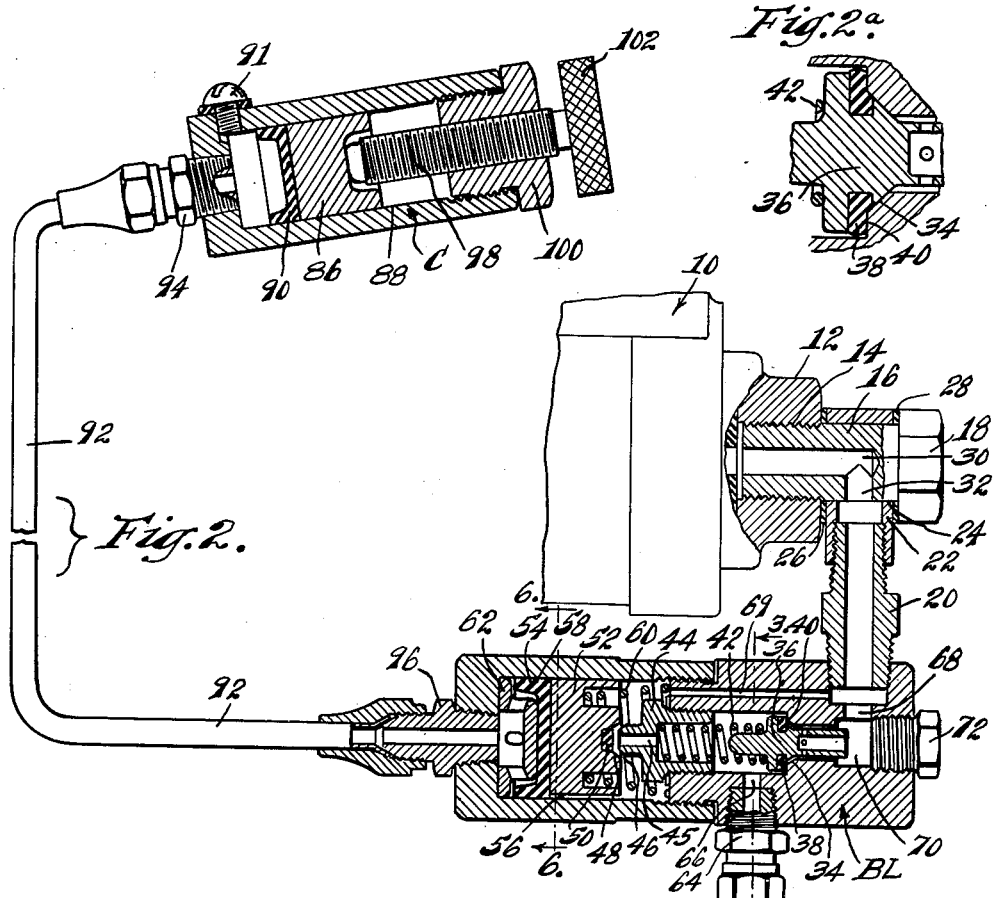
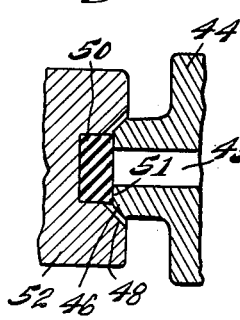
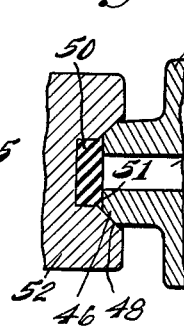
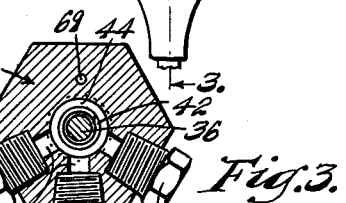
INVENTOR.
Alfred B. Seppmann
BY Bair & Freeman
Attys.

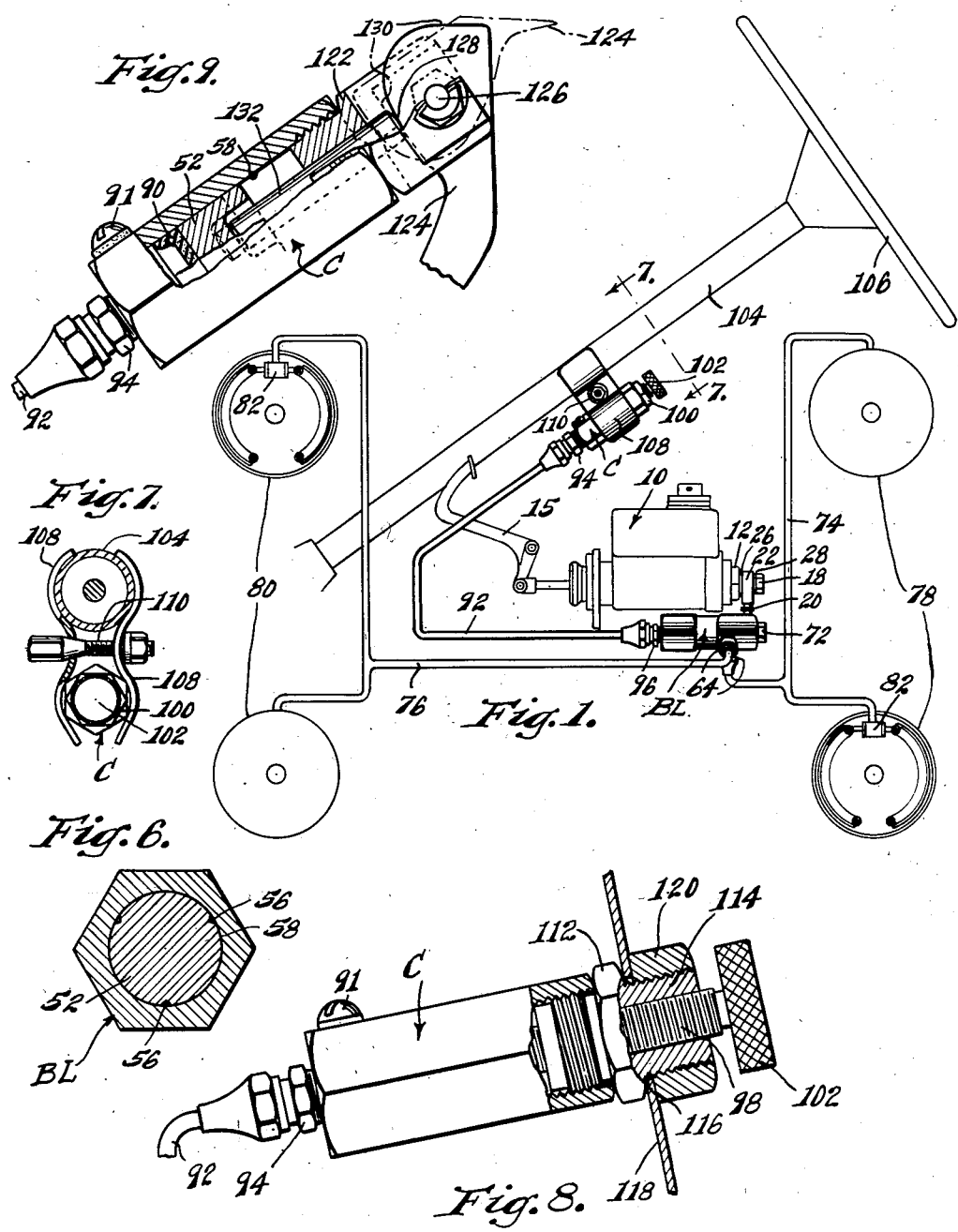

Patented July 1, 1952

2,601,909

UNITED STATES PATENT OFFICE 2,601,909

EMERGENCY BRAKE LOCK

Alfred B. Seppmann, Mankato, Minn.

Application December 15, 1947, Serial No. 791,905

4 Claims. (Cl. 188—152)

This invention relates to a hydraulic type of emergency brake lock whereby the service brakes of a truck, automobile or the like may be used as emergency brakes by operating a hydraulic locking means to lock them in their applied position.

Heretofore trucks and the like provided with hydraulic brakes have been equipped with mechanical emergency brakes which are expected to hold the load in the event that it is necessary to lock the truck against movement as when leaving it standing or when it is necessary to stop on a hill temporarily for the purpose of changing a tire or effecting some other necessary repair on the vehicle. The mechanical emergency brakes are not as positive as hydraulic brakes, and are subject to mechanical wear which sometimes results in their failure at an urgently needed time.

It is the purpose of my present invention to provide an emergency brake lock which is connected in the hydraulic service brake system in such manner that at the will of the driver, the service brakes can be locked in the applied position for the purpose of holding the load. Thus, the advantage of the hydraulic brakes is secured in an emergency and the emergency brake lock operates upon the service brakes which have been continuously used in connection with the operation of the truck, and which the driver therefore knows are in good operating condition, whereas the mechanical emergency brake may have been unused for some period of time, and the cables or levers rusted or weakened so that he is never as sure of their successful operation as he is of the hydraulic service brakes.

One object of my invention is to provide an emergency brake lock in the form of a unit that can be interposed between the master cylinders and a line to the brakes and operated selectively at a position on the steering column or dash to lock the brakes at will or render the emergency brake lock inoperative so that the brakes operate in the normal manner.

Another object is to provide a brake lock unit in the form of a check valve and a selectively operable valve, the selectively operable valve being hydraulically controlled from a control unit adjacent the steering wheel or on the dash so that it can be readily adjusted for rendering the check valve operable for brake lock use or inoperable for normal service brake use.

Still another object is to provide the brake lock unit in the form of a check valve and a second valve bypassing the check valve, the second valve being normally open and capable of being closed at the will of the driver, whereupon the check valve becomes operable to prevent return flow of brake fluid which was pumped to the service brakes by depressing the service brake pedal.

A further object is to provide a brake lock unit and a control unit therefor which are hydraulically connected together by a hydraulic system that is automatically charged with brake fluid from the master cylinder itself, thus simplifying installation of the emergency brake lock.

Still a further object is to provide a brake lock unit that may be readily interposed between a master cylinder and the brake fluid lines to the brakes of a vehicle and operated by a control unit which may be positioned remote from the lock unit and operatively connected therewith by a hydraulic line, thus reducing installation time and effort to a minimum.

An additional object is to provide the valves of my brake lock unit special double-seating arrangements wherein initial seating is had on sealing washers of neoprene or the like, and after slight compression thereof, metal to metal seating occurs to prevent further compression of the neoprene, and thus lengthen its service life considerably.

With these and other objects in view, my invention consists in the construction, arrangement and combination of the various parts of my device, whereby the objects contemplated are attained, as hereinafter more fully set forth, pointed out in my claims and illustrated in the accompanying drawings, wherein:

Figure 1 is a diagrammatic view showing my emergency brake lock connected between a master cylinder and the brakes of a truck or the like;

Figure 2 is a sectional view through the brake lock unit and its control unit, together with a connecting element for connecting the brake lock unit to the master cylinder;

Figure 3 is a sectional view on line 3—3 of Figure 2 showing the outgoing connections for the brake fluid lines;

Figure 4 is an enlarged sectional view through a valve of my brake lock unit showing an initial seating position;

Figure 5 is a similar sectional view showing the final seating position;

Figure 6 is a sectional view on line 6—6 of Figure 2;

Figure 7 is an enlarged sectional view on line 7—7 of Figure 1 showing one way of supporting the control unit for my emergency brake lock;

Figure 8 is a view similar to Figure 2 showing the control unit partially in section and a modified construction whereby it is supported on the dash instead of the steering column on the truck; and Figure 9 is a similar view showing a modified form of control unit wherein a cam lever may be made to assume either one of two positions for rendering the brake lock effective or ineffective instead of using the screw threaded type of control device shown in Figures 2 and 8.

On the accompanying drawings I have used the reference numeral 10 to indicate in general a master cylinder of a hydraulic brake system. Such a cylinder is shown in detail in my copending application Serial No. 691,251, filed August 17, 1946, now Patent No. 2,580,850, issued January 1, 1952. The master cylinder 10 has an outlet fitting 12 threaded as at 14 to normally receive a fitting on the intake end of the fluid brake line system. I remove such fitting and in place thereof screw a stud 16 into the threads 14, the stud having a head 18.

My emergency brake lock consists of a brake lock unit BL and a control unit C. The brake lock unit BL has an intake fitting 20 threaded into the head of another fitting 22 that has a bore 24 surrounding the stud 16. Gaskets 26 and 28 are interposed between the elements 12, 22 and 18 to effect a seal and the stud 16 is provided with a bore 30 and a lateral passageway 32 to communicate the interior of the fitting 12 with the fitting 20.

Within the brake lock unit BL, a valve seat 34 is provided. A valve plug 36 is adapted to seat thereagainst with a metal to metal seat. The valve plug 36 (Fig. 2a) has a resilient sealing washer 38 thereon adapted to contact a face 40 of the valve seat 34. The parts are so proportioned that the washer 38 engages the face 40 a few thousandths of an inch before the plug 36 seats against the seat 34, for a purpose which will hereinafter appear.

A spring 42 normally seats the valve plug 36. This spring is retained in position by a retainer 44 which in itself constitutes a valve plug 46 to seat against a seat 48 and a resilient disc 50. The disc 50 is carried by a piston 52 backed by a sealing cup 54 of neoprene or the like. The piston 52 as shown in Fig. 6 is provided with grooves 56 in its periphery to permit passage of oil.

The cup 54 and the piston 52 are adapted to travel longitudinally in the bore 58 of the brake lock BL. A spring 60 normally unseats the seat 48 and the disc 50 from the valve plug 46 and engages the cup 54 with a stationary stop 62.

An outlet fitting 64 communicates with the outlet side of the valve plug 36 by means of a passageway 66 and the inlet fitting 20 communicates with the inlet side of the valve plug 36 by means of passageways 68 and 70. The outer end of the passageway 70 is plugged at 72, the purpose being so that the fitting 20 may be substituted for the plug and the plug for the fitting in the event that it is desirable to have brake lock BL extend downwardly from the fitting 20 where space is available that might not be available directly underneath the master cylinder. Thus, the brake lock unit is adapted for universal mounting.

The fitting 64 connects with a brake line 74 and a second fitting 64 may connect with a second brake line 76. The line 74 may extend to the rear brakes 78 and the line 76 to the front brakes 80 as illustrated in Figure 1, the lines supplying brake fluid to the actuating cylinders 82 of the brakes.

It will be noted in Figure 3 that a third opening is provided for a third fitting 64 but is plugged by a plug 84, the purpose of this arrangement being to provide for as many brake lines as found in any given truck or truck-trailer combination. In some instances, of course, a single brake line extends to all four brakes and two of the plugs 84 would be provided in that case.

The control unit C comprises a piston 86 in a cylindrical bore 88 with a sealing cup 90 ahead of the piston. The space in the bore ahead of the sealing cup is connected by a hydraulic line 92 and fittings 94 and 96 to the space in the cylinder 58 ahead of the sealing cup 54.

The piston 86 is adapted to be manually and selectively operated (left in the position of Fig. 2 for non-operation of the brake lock or the piston 86 pushed toward the left to push the piston 52 toward the right and close the valve 46—48—50 in the operative position) by means of a screw threaded element 98 threaded in a retainer nut 100. The element 98 is provided with a knurled knob 102 for the purpose of rotating it. The cylinder 88 is provided with a vent plug 91, the purpose of which will hereinafter appear.

The control unit C may be supported on the steering column 104 of the vehicle, the steering wheel being shown at 106. By way of illustration, the manner of support is a pair of clamp straps 108 engaging the steering column and the control unit C and clamped in position by a clamp bolt 110. This places the knob 102 at a convenient location for operation by the driver of the vehicle.

In Figure 8, I show a modification of the control unit in which the nut 100 of Figure 2 is replaced by a special nut 112 having a threaded shank 114. This shank is adapted to pass through an opening 116 of the dash 118 and the control unit is retained in position by a lock nut 120. The control unit is thus dash-mounted which in some instances is more convenient than being steering column-mounted. This is especially true when the brake lock is installed on a passenger automobile.

In Figure 9 I show another modified form of control unit wherein a special nut 122 replaces the elements 100 and 112 of Figures 2 and 8. The nut 122 is bifurcated and a cam lever 124 is pivoted between its arms at 126. The cam lever has a cam surface provided with a low point at 128 and a high point at 130. These surfaces are adapted to coact with a sliding pin 132 engageable with the piston 86 instead of the threaded element 98 as in Figures 2 and 8.

PRACTICAL OPERATION

Installation

In the installation of my emergency brake lock, the brake lines 74 and 76 originally connected directly to the master cylinder 10 are disconnected therefrom and the brake lock unit BL interposed between the fitting 12 of the master cylinder and the lines 74 and 76 in an obvious manner. The stud 16 may be interchangeable with others having the proper thread so that the brake lock unit may be installed on most existing types of master cylinders, the combination of fitting 22 and the proper stud 16 serving as an adapter.

The fitting 20 supports that brake lock unit BL and, of course, additional means may be provided for additionally supporting it if necessary or desirable. The control unit C is installed wherever desired and the connection 92 between the brake lock unit and the control unit made, the element 92 being in the form of a hydraulic tube (copper or the like) so that it is readily bent, cut to length and positioned between the brake lock unit and the control unit wherever space is available.

After installation, the tube 92 and the cylinders 58 and 88 between the sealing cups 54 and 90 are filled with brake fluid in the following described manner. The brake pedal 15 (see Fig. 1) is depressed which forces oil from the master cylinder 10, and such oil flows through a bypass passageway 69 into the space in the cylinder 58 behind the piston 52.

At this time, the plug 91 is left out so that the brake fluid may flow through the grooves 56 of Figure 6, and pass the edge of the cup 54, then flow through the openings in the stop 62 and into the line 92. Thus, the air is driven out of the system through the opening in the control unit left unplugged by removing the plug 91 and when fluid starts to flow out of this opening, the brake pedal is no longer depressed, but is held at that position and the plug 91 inserted to seal the system. This operation may take all of a single brake pedal travel and part of a second one and may necessitate adding additional brake fluid to the reservoir of the master cylinder.

The emergency brake lock system is thus charged with operating fluid, and will subsequently remain charged, even though there is slight leakage, as any time the fluid becomes less, additional fluid will leak through the grooves 56 and past the cup 54 or be forced in this direction whenever the pressure within the brake lock unit BL is greater than the pressure between this unit and the cup 90 in the control unit C.

When it is desirable to use the service brakes 78 and 80 in their normal capacity, the parts are adjusted as in Figure 2 with the spring 60 holding the seat 48 and the disc 50 of the piston 52 unseated from the valve plug 46. Accordingly, fluid may freely bypass the check valve 36 through the passageway 69 and then through the bore 45 of the element 44. When the brakes are applied exceptionally hard, the check valve 36 may open against the action of the spring 42 to permit freer flow of brake fluid to the brakes.

*Operation*

When it is desirable to use the service brakes 78 and 80 as an emergency brake system, it is merely necessary to turn the screw 98 clockwise by manipulating the knob 102 and this forces the piston 86 forwardly in the cylinder 88. Brake fluid is thereby displaced downwardly through the tube 92 and against the sealing cup 54 for moving the piston 52 first to the position of Figure 4 with the disc 50 of the piston engaging a face 51 on the valve plug 44 to effect a seal between the bypass passageway 69 and the outlet side of the check valve of 36. Then upon further pressure being exerted by the knob 102, metal to metal seating will occur between 46 and 48 as in Figure 5 which positively stops further compression of the disc 50 so as to prevent the shortening of its life.

With this arrangement, I have the advantage of both a resilient seal, the life of which is usually not very great but is desirable from the standpoint of sealing efficiency, and a metal to metal seal which is not always reliable because grit may get between the surfaces yet is desirable because it will outlast a resilient seal many times over. However, with my combination arrangement, a resilient seal is effected and then the resilient element is protected by a metal to metal seating which positively prevents further compression of the resilient seal so that its life is many times that of a seal not protected in this manner. At the same time, the pressure may increase greatly after metal to metal seating to effect a more efficient sealing between the metal surfaces, and if any grit is present between them, I still have a resilient seal that holds against the pressure.

The check valve 36 is similarly constructed and operates in a similar manner so that both valves are relatively long-lasting and service-free for many thousands of operations as distinguished from the necessity in most hydraulic brake valves of replacing resilient sealing elements after a few thousand operations.

After the valve 46—48—50 is closed, it is obvious that the only passageway for brake fluid from the master cylinder to the lines 74 and 76 is through the check valve 36. Accordingly, the brakes may be applied by depressing the pedal 15 in the usual manner but the brakes will be held applied when the pressure is released from the brake pedal, due to the back pressure causing the check valve 36 to close. The brakes will then remain applied until such time as it is desirable to release them.

Release of the brakes is accomplished by rotating the knob 102 counterclockwise which permits the spring 60 to open the bypass valve 48—50—46 and move the brake fluid in the line 92 in a reverse direction which causes the piston 86 to follow-up the threaded element 98. The rotation of the knob 102 need be no more than about half a revolution to move from operative to inoperative position of the emergency brake lock unit or vice versa. When the bypass valve is open, of course, the brake fluid returns from the lines 74 and 76 through the bypass passageway 69 and into the master cylinder 10.

Hand operation of the knob 102 is desirable so that the driver can have his feet free for operation of the clutch and accelerator, particularly when releasing the emergency brake lock on an uphill slope. By using the arrangement shown in Figure 9, location of the knob is dispensed with and instead the lever 124 may be merely swung to the dot and dash position to render the brake lock operative, or to the full line position for rendering it inoperative.

My system is readily adaptable for all types of hydraulic brakes, and has a number of advantages apparent from the foregoing objects and specifications.

Some changes may be made in the construction and arrangement of the parts of my emergency brake lock without departing from the real spirit and purpose of my invention, and it is my intention to cover by my claims any modified forms of structure or use of mechanical equivalents which may be reasonably included within their scope.

I claim as my invention:

1. In an emergency brake lock, a brake lock unit comprising a body having a valve seat, a check valve normally seated thereon, said valve body having a lateral extension provided with a swivel fitting connection to a master cylinder whereby to connect said valve body in an interposed position between the master cylinder and the brake lines with said check valve opening toward the brake lines, a bypass passageway around said check valve, a spring opened bypass valve controlling said passageway, and hydraulic means operable from a remote point such as the steering column for positively closing said bypass valve when it is desirable to render said brake lock unit operative or permit it to open under action of its spring when release of the brakes from locked position is desirable.

2. An emergency brake lock comprising a brake lock unit having a body provided with a valve seat, a check valve normally seated thereon, said valve body having a lateral extension provided for connection to a master cylinder whereby to connect said valve body in an interposed position between the master cylinder and the brake lines with said check valve opening away from the master cylinder, a bypass passageway around said check valve, a bypass valve controlling said passageway, spring means normally opening said bypass valve, and hydraulic means including an actuating piston, an actuated piston and screw means to move said actuating piston and thereby said actuated piston, said screw means being operable from a remote point for causing said actuated piston to selectively close and said spring means to open said bypass valve with the closing action positive under the influence of said hydraulic means.

3. An emergency brake lock comprising a brake lock unit having a body provided with a valve seat, a check valve normally seated thereon, said valve body being adapted for interposition between a master cylinder and the brake lines, said valve body having a plural outlet for individual connection with different lines to the brakes, said check valve opening away from the master cylinder, a bypass passageway around said check valve, a bypass valve controlling said passageway, spring means normally opening said bypass valve, a piston for controlling said bypass valve, a control unit for controlling said piston comprising a second piston and manually operable leverage means to move the same in one direction, and a hydraulic connection between said pistons for moving the former to close said bypass valve or permit it to be opened by said spring means and said second piston thereby returned in accordance with movements of said first piston by said spring means.

4. In a brake lock system, a check valve unit having a swivel connection with a master cylinder permitting said unit to be positioned alongside the master cylinder but in any quarter of a circle in a plane at right angles to the axis of the master cylinder, said unit having a plural connecting means with the brake lines to permit individual connection with different brake lines, said unit including a check valve opening toward the lines, a bypass valve around said check valve, each of said valves comprising a valve seat and a valve plug, a spring to normally close said bypass valve, means for manually operating said bypass valve from a remote position, said means comprising a first piston and a second piston, a cam lever operable when moved in one direction to move said first piston, said first piston being hydraulically connected with said second piston, said second piston being operatively connected with said bypass valve, and said spring being operable to act through said pistons and hydraulic connection to cause said first piston to follow said lever when moved in an opposite direction.

ALFRED B. SEPPMANN.

REFERENCES CITED

The following references are of record in the file of this patent:

UNITED STATES PATENTS

| Number | Name | Date |
|---|---|---|
| 802,642 | Huxley | Oct. 24, 1905 |
| 1,965,459 | Fischer | July 3, 1934 |
| 2,153,042 | Graziano | Apr. 4, 1939 |
| 2,187,789 | Lanz | Jan. 23, 1940 |
| 2,260,381 | Kennon | Oct. 28, 1941 |
| 2,297,076 | Sacks | Sept. 29, 1942 |

FOREIGN PATENTS

| Number | Country | Date |
|---|---|---|
| 306,618 | Italy | Mar. 27, 1933 |
| 336,140 | Great Britain | Oct. 9, 1930 |
| 444,930 | Great Britain | Mar. 31, 1936 |